United States Patent Office 2,963,366
Patented Dec. 6, 1960

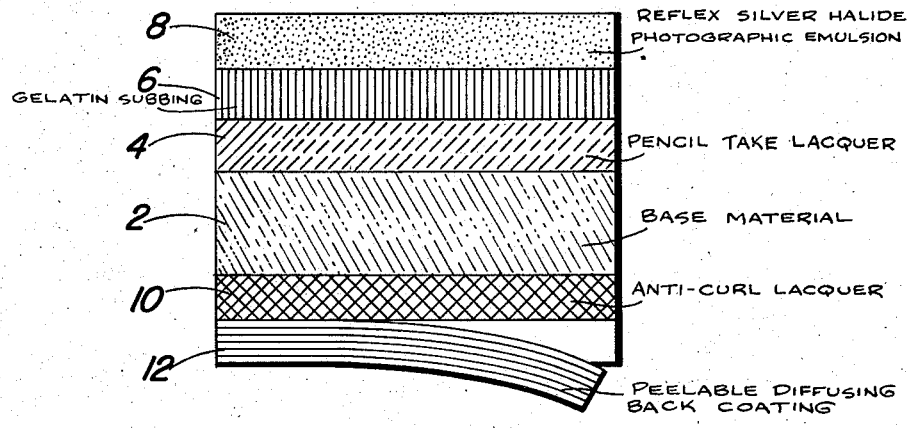
Fig. I
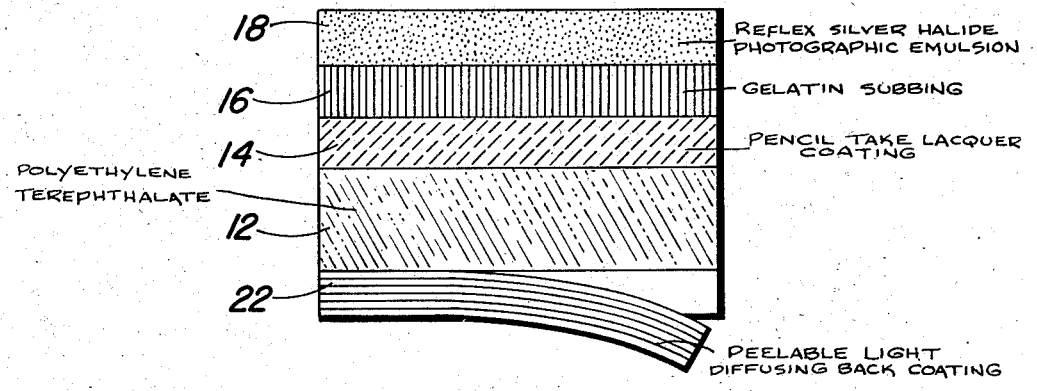
Fig II

2,963,366

PHOTOSENSITIVE MATERIAL

Jaromir Kosar, Beechhurst, N.Y., and Allan R. A. Beeber, Elizabeth, N.J., assignors to Keuffel & Esser Company, Hoboken, N.J., a corporation of New Jersey Filed Aug. 27, 1956, Ser. No. 606,248

5 Claims. (Cl. 96—83)

This invention relates to photographic reflex copying processes and to light sensitive materials suitable for use in such processes. In particular, the invention relates to materials having a clear light transmitting base provided on one side with a photographic coating suitable for reflex printing and provided on the other side with a peelable light diffusing back coating.

The reflex method of photographic printing is known in the art as a method suitable for making a photographic reproduction from an opaque original by contact exposure. In this process, a light sensitive layer carried on a light transmitting support is placed in contact with the matter to be copied and exposed through the support. Light passes through the support and through the light sensitive layer onto the document to be copied. Light is reflected from the bright parts of the document and back through the light sensitive layer. A portion of this light passes into the support and is again reflected back to the light sensitive layer. Hence the maximum photographic effect is obtained in those areas of the light sensitive layer which are adjacent to the bright parts or light reflecting areas of the document to be copied. Conventional silver halide emulsion light sensitive layers for this purpose will give a reversed negative image after development in any of the usual developers.

If the base material on which the light sensitive layer is applied has a high degree of light transmission with only a small amount of light diffusing effect, it is important, as known in the art, to provide a light diffusing coating on one or both sides of the base material. This light diffusing coating reflects the light which has been reflected from the light-reflecting areas of the document to be copied back into the light sensitive layer and hence serves to magnify the photographic effect which takes place in the light sensitive layer. Base materials of this type include plastic films or foils such as cellulose nitrate and cellulose acetate film.

However, the present invention is particularly concerned with light transmitting supports used for the reproduction of engineering drawings or in the reproduction of templates from full sized drawings which templates are then used for cutting out sheet materials in production such as the production of parts of large surface area for airplanes and the like. In this case it is also important that the base material have good dimensional stability. Materials which have been found suitable for this purpose include a woven glass fabric impregnated with a polyester resin and clear films or foils of polyester resins such as polyethylene terephthalate films. Clear vinyl films may also be used. All of these base materials require a light diffusing coating on the side opposite from the side which carries the light sensitive layer for the reasons pointed out above. However, in this field of reproduction, the image produced on the stable base material must very often be recopied. For example, in the aircraft industry, additional templates may be reproduced from this reflex print. In other words, the material in question can serve as an intermediate reflex reproduction material.

Although silver halide emulsion layers for reflex printing which function in the conventional manner (i.e. yielding a reversed negative image) are useful in the processes described, there are cases when it is desirable to use direct positive silver halide emulsion layers for reflex printing. For example, if it is desired to make a diazotype copy from the reversed negative image on the ordinary reflex print, it would first be necessary to reverse the image by making a positive intermediate copy on transparent photographic material. To eliminate this step a direct positive reflex emulsion may be coated on the base material. Because the sensitized side of the film is in direct contact with the printed side of the original, the reproduction will be a reversed image. However, when this copy is used as an intermediate in a reversed position, the copies will again be reversed, thus giving a right reading positive copy. The base material may be the same as described for the ordinary reflex material and a light diffusing coating is necessary. The presence of the light diffusing coating, which is necessary for the production of good reflex prints on these base-materials, is a disadvantage when it comes to the production of additional copies from the image produced on the dimensionally stable base material. One disadvantage is the prolonged exposure time for the making of copies from such a reflex negative. Another disadvantage is reduction in contrast of the negative by the diffusing layer applied to the back surface which adversely affects the quality of the reprint.

The objects of the present invention are to eliminate the above disadvantages of the prior art intermediate reflex reproduction material by using a peelable light diffusing back coat. At any convenient stage of the processing treatment after the exposure, the new peelable light diffusing back coat may easily be peeled from the base material leaving a transparent intermediate film which is excellent for the production of further copies.

These objects of the invention and the means for their attainment will be more fully understood by reference to the following description taken in connection with the accompanying drawing which illustrates two specific embodiments of the invention and in which:

Fig. I is a view in diagrammatical sectional elevation showing an embodiment of the invention using an impregnated glass cloth base material and Fig. II is a view in diagrammatical sectional elevation showing an embodiment of the invention using a polyester film base material.

Referring to Fig. I, the glass cloth base material 2 which is impregnated with a polyester resin is coated on one side with a pencil take lacquer 4 which in turn is coated with a gelatin subbing layer 6 and a reflex silver halide photographic emulsion 8. On the other side, the glass cloth polyester impregnated base material is coated with an anti-curl lacquer coating, 10, and the peelable diffusing back coating 12.

Referring to Fig. II, a dimensionally stable polyester film 12 such as polyethylene terephthalate is coated on one side with a pencil take lacquer coating 14, a gelatin subbing layer 16 and a reflex silver halide photographic emulsion layer 18. The back side of the base material 12 is coated directly with a peelable light diffusing back coating, 22.

It should be realized that the particular combination of layers used for the reflex reproduction material will depend upon the results sought. For example, pencil-take lacquer layers 4 and 14 need only be used if pencil-take is a necessary requirement, i.e., if it is necessary to write or draw on the reflex prints which are obtained.

Likewise the anti-curl layer is only necessary depending upon the base material and the amount of curl which can be tolerated in any particular application. In some cases, it may be desirable also to apply an anti-curl lacquer coating to the polyester film type of base material shown in Fig. II.

Suitable base materials for the intermediate reflex materials of the present invention include glass cloth impregnated with polyester resin, polyester films such as polyethylene terephthalate film, clear vinyl films, cellulose acetate, cellulose nitrate, etc.

If the pencil-take layer is required, it may be obtained by coating on to the base material a suitable lacquer containing a sufficient amount of abrasive material so that the coating will accept pencil lines. For example, a suitable pencil-take coating for the glass cloth polyester resin impregnated base material is the following:

| | Lbs. |
|---|---|
| Nitrocellulose RS (60–80 sec.) | 100 |
| Modified rosin (Teglac 2–152) (American Cyanamide) | 50 |
| Dioctyl phthalate plasticizer | 20 |
| Diatomaceous earth | 60 |
| Toluol | 450 |
| Ethanol | 80 |
| Ethyl acetate | 425 |
| Butyl acetate | 50 |

A suitable pencil-take coating for polyester films has the following composition:

| | | |
|---|---|---|
| Siliceous pigment | lbs | 10 |
| Alkyd resin solids | lbs | 5 |
| Nitrocellulose solids | lbs | 5 |
| Cobalt naphthenate drier | oz | 1 |
| Solvents* | lbs | 40 |

*Selected from esters, ketones and the like such as ethyl acetate, butyl acetate and methyl ethyl ketone.

The gelatin subbing layer may be of the conventional type used for silver halide emulsions including gelatin (acetic acid) and solvents such as alcohol and acetone. Hardening agents such as formaldehyde may also be used in the subbing in some cases. The anti-curl lacquer coating may be based on any suitable lacquer coating that prevents the curling of the base material due to the photosensitive coatings on the opposite side. For example, a nitrocellulose lacquer, an alkyd resin coating or a lacquer including both nitrocellulose and alkyd resin may be applied in suitable solvents.

The image-forming emulsion layer is preferably as transparent as possible to the light of the color to which the emulsion is to be exposed, consistent with the desired photographic properties. In the preferred form, the layer may consist of a silver halide emulsion such as silver chloride, bromide, chlorobromide or iodobromide having a gamma as high as possible. The density at which the straight line portion of the characteristic curve of the emulsion is reached should be as low as possible. Preferably, the major portion of the $D$ log $E$ curve should be very steep.

According to the present invention direct positive emulsions may also be used. The direct positive emulsion is preferably of the silver halide type, fogged at high temperature and/or by the use of catalysts known to promote fog, such as copper ions. The reversal may be promoted by improving the cleanness of the highlight while increasing the maximum density in the shoulder of the reversal curve by using various heterocyclic bases, such as benzotriazole or substituted benzotriazoles. Independently, the increase of reversal maximum density and decrease of minimum density may be obtained by suitable choice of optical sensitizing dyes.

The peelable diffusing back coat may include a variety of different resinous materials including polyvinyl chloride, polyvinyl acetate, copolymers of vinyl chloride and vinyl acetate, polyvinyl butyral, ethyl cellulose, cellulose acetate, cellulose acetate butyrate, chlorinated rubber, nitrocellulose and acrylic resins. The peelable diffusing back coat should contain sufficient pigment to give the desired light diffusing effect. Suitable pigments include titanium dioxide, zinc oxide and/or chrome yellow. Sufficient plasticizer should be added to this coating so that it will have poor adhesion to the base material, thus making it possible to readily peel the coating from the base material any time after exposure. Suitable plasticizers include castor oil, sebasic alkyd resin, dioctyl phthalate, chlorinated paraffin, vinyl chloride acetate and resinous polyester plasticizers. The proportion of plasticizer will depend upon the particular resinous material chosen as a base for the peelable light diffusing back coating, the type and amount of pigment, etc. as well as upon the degree of peelability required. However, in most cases, the amount of plasticizer will fall in the range of from 5 to 95 parts of plasticizer per 100 parts of resinous material. For certain materials, e.g., chlorinated rubber, it may not be necessary to use any plasticizer at all. The resinous base material, pigment and plasticizer used for the peelable light diffusing back coat are dispersed in suitable solvents and applied to the base material by conventional coating techniques. It is necessary that the diffusing layer should not contain material having any deteriorating effect on the photographic emulsion, and it should not change color during exposure or processing. The pigment should be finely divided and uniformly dispersed. High reflecting power of the pigment is desirable but the layer may not be opaque. It is preferable that the diffusing coating have a yellow color. This yellow color may be obtained either by using a yellow colored pigment such as chrome yellow or by using any of the water or organic solvent soluble dyes such as Metanil Yellow or Thioflavin. However, the color of the light diffusing layer may be varied according to the emulsion and according to the color of the matter to be copied following the well known principles of the photographic art.

Examples of compositions for the peelable light diffusing back coating are given below. These are suitable for use on glass cloth base material impregnated with a polyester resin or on polyethylene terephthalate films and also on other types of clear plastic films.

Example I

| | Parts |
|---|---|
| Titanium oxide | 60 |
| Polyvinyl butyral | 100 |
| Alcohol | 500 |
| Caster oil | 35 |

Example II

| | |
|---|---|
| Titanium oxide | 60 |
| Ethyl cellulose | 100 |
| Toluol | 500 |
| Sebasic alkyd | 50 |

Example III

| | |
|---|---|
| Zinc oxide | 60 |
| Cellulose acetate | 100 |
| Dioctyl phthalate | 45 |
| Thinner | 500 |

Example IV

| | |
|---|---|
| Chlorinated rubber | 100 |
| Titanium oxide | 60 |
| Gravol yellow | 5–15 |
| Chlorinated paraffin | 60 |
| Toluol | 500 |

Example V

| | |
|---|---|
| Acrylic resin | 100 |
| Vinyl chloride-acetate | 30 |
| Chrome yellow | 90 |
| Toluol | 250 |
| Methyl iso butyl ketone | 250 |

Example VI

| | |
|---|---:|
| Vinyl chloride acetate | 100 |
| Polyester plasticizer | 5–75 |
| Chrome yellow | 90 |
| Methyl iso butyl ketone | 250 |
| Toluol | 250 |

In addition to the uses in the production of engineering drawings, production of templates for the aircraft industry, map making and the like, the material of the present invention, particularly when provided with a direct positive emulsion, may be used for making slides suitable for projection purposes. Such slides are frequently required by lecturers and may be produced in one step with the new material from text books, reports, graphs, etc.

After the removal of the peelable light diffusing back coating, the reflex print made on direct positive material is a useful print in itself. The image appears right reading when viewed through the light transmitting base material.

Having thus described the invention, what is claimed is:

1. A photosensitive material for use in making a master copy to be made by a reflex printing process from an original with the light sensitive silver halide emulsion coating in direct contact with the image on the original document comprising a base sheet through which light may be transmitted, a photosensitive coating on one surface of said base sheet material for direct connect with the image on the original document, said photosensitive coating permitting the passage of light therethrough so that the light passed through said photosensitive coating from the base sheet material will not appreciably affect the photosensitive coating but the reflected light from the image will affect the photosensitive coating, a loosely adherent and pigmented peelable light diffusing layer not affected by photographic processing on the other surface of said light transmitting base sheet, said light diffusing layer having sufficient strength to be readily peelable from the light transmitting base sheet whereby the photosensitive coating may be exposed by light which is passed through said light diffusing layer, through said light transmitting base sheet, through said light sensitive coating and is reflected from said document into said photosensitive coating thereby exposing said photosensitive coating, said light diffusing layer including a plasticized organic solvent soluble resinous base material selected from the group consisting of polyvinyl chloride, polyvinyl acetate, copolymers of vinyl chloride and vinyl acetate, polyvinyl butyral, ethyl cellulose, cellulose acetate, cellulose acetate butyrate, chlorinated rubber, nitro cellulose, and acrylic resin, said resinous base material having sufficient plasticizer to prevent tenacious adhesion of the light diffusing layer to said other surface of the base sheet and said plasticizer serving to render the light diffusing peelable layer of sufficient flexibility and strength to provide for peeling of the light diffusing layer from the base sheet without requiring special treatment, said light from said document being reflected by said light diffusing layer whereby sharp images are formed on said material.

2. The invention according to claim 1 in which the resinous base material is vinyl chloride.

3. The invention according to claim 1 in which the resinous base material is polyvinyl butyral.

4. The invention according to claim 1 in which the resinous base material is a copolymer of vinyl chloride, vinyl acetate.

5. The invention according to claim 2, in which a pencil take lacquer is provided between the base sheet and the silver halide emulsion coating.

References Cited in the file of this patent
UNITED STATES PATENTS

| | | |
|---|---|---|
| 2,010,188 | Hagedorn et al. | Aug. 6, 1935 |
| 2,244,304 | Marriage et al. | June 3, 1941 |
| 2,313,570 | Nadeau et al. | Mar. 9, 1943 |
| 2,350,124 | Nadeau et al. | May 30, 1944 |
| 2,398,056 | Staud | Apr. 9, 1946 |
| 2,409,564 | Heinecke et al. | Oct. 15, 1946 |
| 2,544,237 | Reese | Mar. 6, 1951 |
| 2,606,832 | Alles et al. | Aug. 12, 1952 |
| 2,698,235 | Swindells | Dec. 28, 1954 |

OTHER REFERENCES

Jackson British Plastics, June 1950, pages 272–280.

UNITED STATES PATENT OFFICE
CERTIFICATE OF CORRECTION

Patent No. 2,963,366                  December 6, 1960

Jaromir Kosar et al.

It is hereby certified that error appears in the above numbered patent requiring correction and that the said Letters Patent should read as corrected below.

Column 5, line 29, for "connect" read -- contact --.

Signed and sealed this 5th day of June 1962.

(SEAL)
Attest:

ERNEST W. SWIDER
Attesting Officer

DAVID L. LADD
Commissioner of Patents